(No Model.)

A. ALLAN, Jr.
Water Gage.

No. 232,322.        Patented Sept. 21, 1880.

Witnesses:
W. C. Greene
O. R. Greene

Inventor,
Alexander Allan Jr.
by J. H. Adams
Atty

UNITED STATES PATENT OFFICE.

ALEXANDER ALLAN, JR., OF ADDLESTONE, ENGLAND.

WATER-GAGE.

SPECIFICATION forming part of Letters Patent No. 232,322, dated September 21, 1880.

Application filed March 22, 1880. (No model.) Patented in England April 1, 1876.

*To all whom it may concern:*

Be it known that I, ALEXANDER ALLAN, Jr., of Addlestone, in the county of Surrey, England, have invented certain new and useful Improvements in Pressure and Vacuum Gages, for which I have obtained a patent in Great Britain, No. 1,405, bearing date April 1, 1876, and of which the following is a specification.

My invention relates to improvements in pressure and vacuum gages of the kind described in the specification of Letters Patent granted to Alexander Allan, Thomas Whimster, and Robert Gray, and dated October 19, 1858, No. 2,332.

In pressure-gages of the kind referred to a quantity of air is confined in a vessel which, or part of which, is conical or conoidal in shape, and it is by the extent to which the air is compressed in such vessel that the pressure to be indicated is ascertained, the pressure being applied to the confined air through the medium of water or other suitable liquid.

The conoidal part of the vessel may be of glass or metal; but when of metal there must be fitted in connection with it a glass tube, or glass must be fitted in an opening in it, to admit of the height of the liquid being seen. A scale of pounds or other suitable measure of pressure is marked or otherwise applied close beside the part where the indications of the liquid-level are visible, and when the conoidal vessel is properly shaped the divisions on the scale may be at equal distances apart for equal differences of pressure per square inch or other unit.

One of my present improvements consists in forming an enlargement at or in connection with the smaller end of the conoidal space, a plug being provided which is adjustable in an opening in such enlargement, so as to vary at will the internal capacity.

When a separate indicating glass tube is used it is entered into its place through a hole made for the purpose in the head of the metal parts of the instrument. Below the conoidal vessel and indicating-tube is fitted a conical stop-cock plug, so as to admit of clearing the gage and renewing the air-spring.

The instrument may be used for indicating the pressure in a steam-boiler by causing the pressure-pipe to communicate with the water and not the steam-space, and where the water is liable to be muddy a quantity of sponge or other filtering substance is placed in an enlargement of the communicating pipe.

Figure 1:
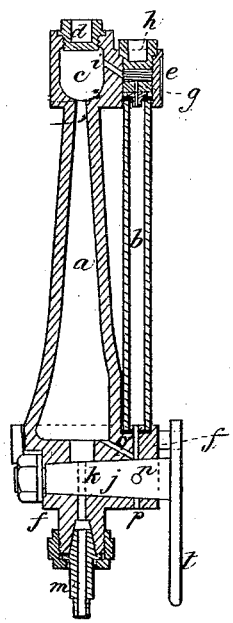
Figure 2:
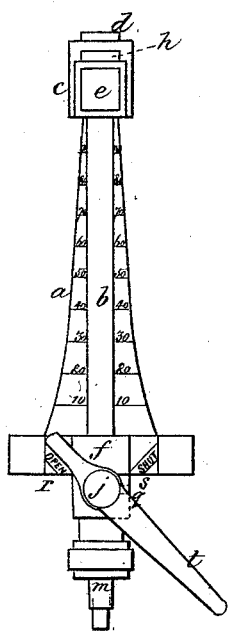
Figure 3:
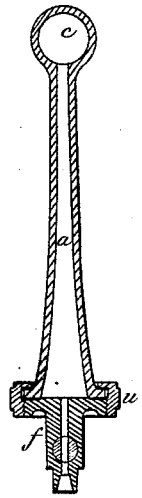
Figure 4:
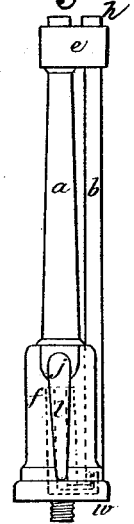
Figure 5:
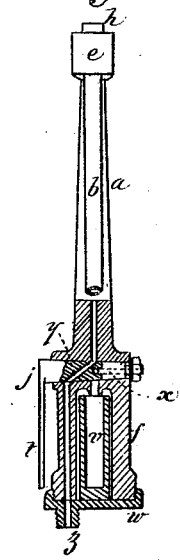
Figure 6:
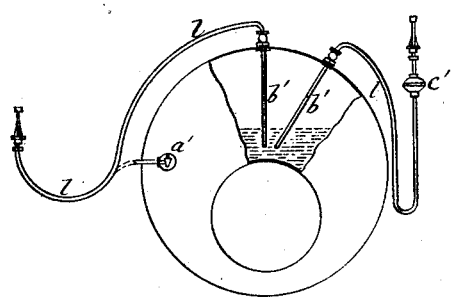

Referring to the accompanying drawings, Figure 1 is a vertical section, and Fig. 2 is a front elevation, of a pressure-gage embodying my improvements. Fig. 3 is a vertical section of a simplified modification of my improvement, suitable for moderate pressures, such as a maximum of thirty pounds above the atmosphere. Fig. 4 is a side elevation, and Fig. 5 a sectional front elevation, of a modification for indicating vacuum. Fig. 6 is a partially-sectioned end elevation of a steam-boiler, showing the mode of connecting my improvement thereto.

$a$ represents a conoidal vessel, to be made of metal, and $b$ is the glass tube used in connection with said vessel. At the top of the conoidal vessel $a$ is an enlargement, $c$, in the upper part of which is fitted a screw-plug, $d$, so as to admit of the capacity of the enlargement being varied by screwing the plug in more or less or by changing it for one of different size. By means of such enlargement and screw-plug small variations in different gages can be made, so that the actual pressures may accurately agree with the equal divisions of the scale. The scale being thus always the same, (for the same range of pressures,) the divisions can be marked permanently on the glass by molding, or by incorporating white or colored marks in the glass, or by stamping or molding on the metal of vessel $a$ or on a separate metal plate. The glass tube $b$ may also be made with the back part white or of some tint that will make the level of the liquid or the divisions of the scale more easily discernible.

The glass tube $b$ is passed to its place through a hole in head $e$, its lower end entering an annular space in the base $f$ of the instrument. The joints at the bottom and top of tube $b$ are rendered tight by interposed rings of rubber or other suitable compressible material. Two plugs, $g\,h$, are screwed into the hole in head $e$, above the tube $b$—the one, $g$, to press down the rubber ring on the tube end, and the other, $h$, to close the top of the opening, while the inner plug, $g$, is bored to allow the top of the glass tube $b$ to communicate by the passage $i$ in the head with the top of the conoidal vessel $a$. A conical stop-cock plug, $j$, is fitted into the base $f$, and has a way, $k$, through it to put the bottom of the vessel $a$ in communication with a pipe, $l$, Fig. 6, by which the pressure to be indicated is transmitted from a boiler or other vessel, such pipe being connected to the base $f$ of the instrument by a coupling, $m$. Through the plug or cock $j$ is also formed a way, $n$, at right angles to the way $k$, so that when the plug is turned to make the way $n$ vertical it allows any liquid in the instrument to run out through the passages $o$ $p$, provided for the purpose, and leading from the bottom of both the vessel $a$ and indicating-tube $b$. At the same time the plug puts an air-hole, $q$, in communication with the interior, which air-hole, being higher than the outlet $p$ for the liquid, facilitates the complete discharge of the liquid. As the liquid runs out the interior of the instrument is refilled with air, thus renewing its proper elasticity, and this renewal of the air can be effected in a few seconds at any time when there is the least doubt as to the indications of pressure. Stops $r$ $s$ are placed on the front of the base $f$, so as to prevent the handle $t$ of stop-cock $j$ from being turned too far in either direction, and the words "Open" and "Shut," or other suitable marks, may be made on the stops with a view of preventing mistakes.

A simplified modification of my improved pressure-gage is shown in Fig. 3, suitable for moderate pressures, such as a maximum of thirty pounds above the atmosphere. The conoidal vessel $a$ is of glass, so that a separate indicating-tube is not required, and the enlargement $c$ is formed on its upper end. This vessel $a$ is secured to the base $f$ by a flanged ring, $u$, screwed upon the base, rubber rings being interposed on both sides of a flange formed on the bottom of the vessel $a$.

In the modification of my device shown in Figs. 4 and 5 a tubular metal column, $a$, is connected by a head, $e$, and base $f$ with a glass indicating-tube, $b$, which latter is secured as hereinbefore described with reference to Figs. 1 and 2.

The glass tube $b$ has united to its lower end a glass vessel, $v$, there being a capillary communication between the bottom of vessel $v$ and the tube $b$, while the otherwise open top of vessel $v$ is, with an interposed rubber ring, pressed tightly up to a bearing in the base $f$, the same being secured by a bottom piece, $w$, screwed upon the base $f$. A stop-cock, $j$, introduced between the bottom of the metal column $a$ and the top of the glass vessel $v$, is made with two ways—one, $x$, of which puts the vessel $v$ and the column $a$, and through the latter the top of the glass tube $b$, in communication with the atmosphere, while the other way, $y$, puts the bottom of column $a$ in communication with the passage $z$, by means of which the instrument is made to communicate with a condenser or other vessel the degree of vacuum in which is to be indicated. A certain quantity of mercury or other suitable liquid is put in the vessel $v$, and when the top of the same and the top of tube $b$ are open to the atmosphere the mercury stands at the same level in vessel $v$ and tube $b$; but when the stop-cock $j$ is turned to the position shown in Fig. 5 the top of vessel $v$ is closed, and the top of tube $b$ being then subjected by the passages $y$ $z$ to the vacuum to be indicated, the air confined in the upper part of vessel $v$ expands and causes the mercury to rise in tube $b$, and thus indicates the degree of vacuum.

A scale is marked on tube $b$ or on the metal column $a$, or it may be marked on a separate plate, which can at any time be adjusted to the exact zero position of the mercury.

Fig. 6 shows the mode of connecting my improved pressure-gage to a steam-boiler. The gage-pipe $l$ may be either connected by a stop-cock, $a'$, fitted below the water-level, or by a stop-cock fitted in the steam-space, but having an internal pipe, $b'$, dipping below the water-level, so as to insure the gage-pipe $l$ being filled with water. Should the water be muddy a sponge or other filtering material is placed in an enlargement, $c'$, on the pipe $l$, so as to render the water actually reaching the gage free from suspended impurities.

What I claim as my invention, and desire to secure by Letters Patent, is—

1. The adjustable enlargement or space $c$, in combination with the small end of the conoidal gage-vessel $a$, substantially as and for the purpose set forth.

2. The stop-cock $j$, provided with the passages $k$ and $n$, in combination with the passage $o$, leading from the vessels $a$ and $b$, and the discharge-passage $p$, as and for the purpose specified.

3. The combination of the conoidal vessel $a$ and vessel $b$ with a conical stop-cock plug, $j$, provided with a way or passage, $k$, connecting with the vessel $a$ and with a way, $n$, connecting with vessels $a$ and $b$, substantially as and for the purpose set forth.

In testimony whereof I have signed my name to this specification in the presence of two subscribing witnesses.

ALEXANDER ALLAN, JR.

Witnesses:
ALBERT EDWIN HICK,
*Scarborough, Yorkshire, England, Solicitor and Notary Public.*
A. SLEIGHTHOLM,
    *Of same place, his Clerk.*